(12) United States Patent
Abron

(10) Patent No.: US 7,037,564 B1
(45) Date of Patent: May 2, 2006

(54) SUBSTRATE SHEETS WITH REMOVABLE STRIP

(75) Inventor: Elijah Abron, 6701 Aldrich Ave. North, Brooklyn Park, MN (US) 55430

(73) Assignee: Elijah Abron, Brooklyn Park, MN (US)

( * ) Notice: Subject to any disclaimer, the term of this patent is extended or adjusted under 35 U.S.C. 154(b) by 107 days.

(21) Appl. No.: 10/413,672

(22) Filed: Apr. 15, 2003

Related U.S. Application Data

(63) Continuation-in-part of application No. 09/848,547, filed on May 3, 2001, now abandoned.

(60) Provisional application No. 60/201,409, filed on May 3, 2000.

(51) Int. Cl.
*B32B 3/02* (2006.01)

(52) U.S. Cl. .................. 428/40.1; 428/41.3; 428/41.4; 428/41.5; 428/41.8; 428/42.1; 428/43; 428/192

(58) Field of Classification Search ................ 428/40.1, 428/41.8, 42.1, 43, 192, 41.3, 41.4, 41.5
See application file for complete search history.

(56) References Cited

U.S. PATENT DOCUMENTS

| | | | |
|---|---|---|---|
| 2,532,011 A | 11/1950 | Dahlquist et al. | |
| 3,533,899 A | 10/1970 | Kapral | |
| 4,077,830 A | 3/1978 | Fulwiler | |
| 4,111,121 A | 9/1978 | Borum | |
| 4,232,087 A | 11/1980 | Trask | |
| 4,232,299 A | 11/1980 | Eisenberg | |
| 4,447,481 A * | 5/1984 | Holmberg et al. | 428/41.7 |
| 4,590,109 A | 5/1986 | Holmberg | |
| 4,759,643 A | 7/1988 | Canno | |
| 4,768,810 A | 9/1988 | Mertens | |
| 4,913,926 A | 4/1990 | Rutkowski | |
| 4,965,113 A | 10/1990 | Jones et al. | |
| 4,974,035 A | 11/1990 | Rabb et al. | |
| 4,980,212 A | 12/1990 | Marquis et al. | |
| 5,050,909 A | 9/1991 | Mertens et al. | |
| 5,095,369 A | 3/1992 | Ortiz et al. | |
| 5,153,041 A | 10/1992 | Clements et al. | |
| 5,201,464 A | 4/1993 | File | |
| 5,258,809 A | 11/1993 | Wiedemer | |
| 5,334,094 A | 8/1994 | Armbruster | |
| 5,348,680 A | 9/1994 | Maitz | |
| 5,366,776 A | 11/1994 | Mertens | |
| 5,415,799 A | 5/1995 | Maitz | |
| 5,418,026 A | 5/1995 | Dronzek, Jr. et al. | |
| 5,430,536 A | 7/1995 | Fullerton et al. | |
| 5,513,013 A | 4/1996 | Kuo | |

(Continued)

OTHER PUBLICATIONS

H.B. Fuller Company Product Catalog, http://www.hbfullerstore.com/fullerstore/en_US/SFMain, reprinted Jun. 12, 2002.

*Primary Examiner*—Nasser Ahmad
(74) *Attorney, Agent, or Firm*—Patterson, Thuente, Skaar & Christensen, P.A.

(57) ABSTRACT

A composite assembly for assembling documents and including a substrate sheet, and adhesive layer, and a release liner disposed over the adhesive layer. To assemble a document, the pages of the document are printed on the substrate sheets, the substrate sheets are ordered and aligned, the release liners are removed by the a portion of the release liner overlaying a removed tab being grasped and pulled to peel the release liners from the adhesive layers, and the pages are bonded together by pressure.

7 Claims, 4 Drawing Sheets

U.S. PATENT DOCUMENTS

| | | |
|---|---|---|
| 5,543,190 A | 8/1996 | Johnson et al. |
| 5,543,191 A | 8/1996 | Dronzek, Jr. et al. |
| 5,575,574 A | 11/1996 | Mertens |
| 5,616,625 A | 4/1997 | Hung et al. |
| 5,641,550 A | 6/1997 | Berman et al. |
| 5,673,943 A * | 10/1997 | Campbell ................... 283/79 |
| 5,705,241 A | 1/1998 | Schutze |
| 5,727,819 A | 3/1998 | Grosskopf et al. |
| 5,753,414 A | 5/1998 | Rach et al. |
| 5,776,591 A | 7/1998 | Mertens |
| 5,792,535 A | 8/1998 | Weder |
| 5,863,629 A | 1/1999 | Kuo et al. |
| 5,866,656 A | 2/1999 | Hung et al. |
| 5,883,217 A | 3/1999 | Werenicz et al. |
| 5,939,499 A | 8/1999 | Anderson et al. |
| 5,944,219 A | 8/1999 | Emoff et al. |
| 5,965,225 A | 10/1999 | Torres |
| 5,965,685 A | 10/1999 | Fromwiller |
| 5,967,555 A | 10/1999 | Samelian |
| 6,013,149 A | 1/2000 | Timmerman et al. |
| 6,025,031 A | 2/2000 | Lettmann et al. |
| 6,027,600 A | 2/2000 | Sankaran et al. |
| 6,040,026 A | 3/2000 | Iwabuchi et al. |
| 6,042,914 A | 3/2000 | Lubar |
| 6,153,278 A | 11/2000 | Timmerman et al. |
| 6,656,555 B1 * | 12/2003 | McKillip ................... 428/40.1 |

* cited by examiner

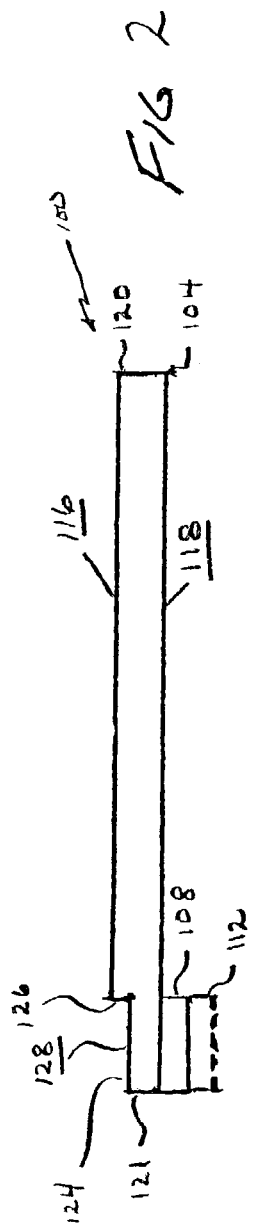
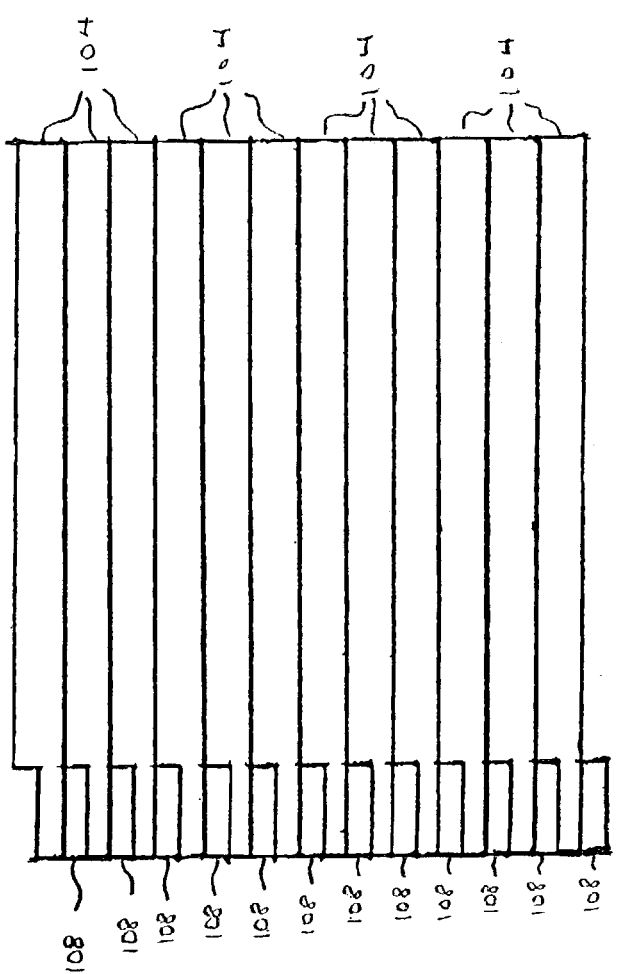

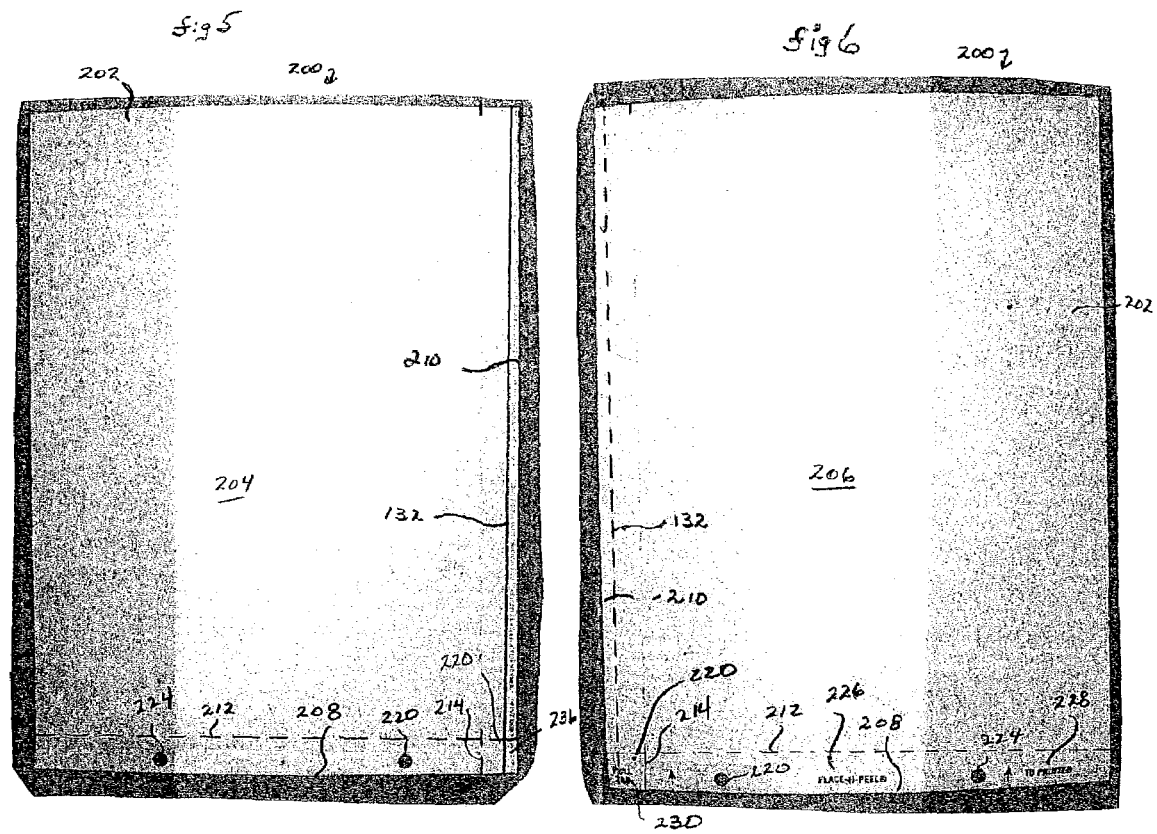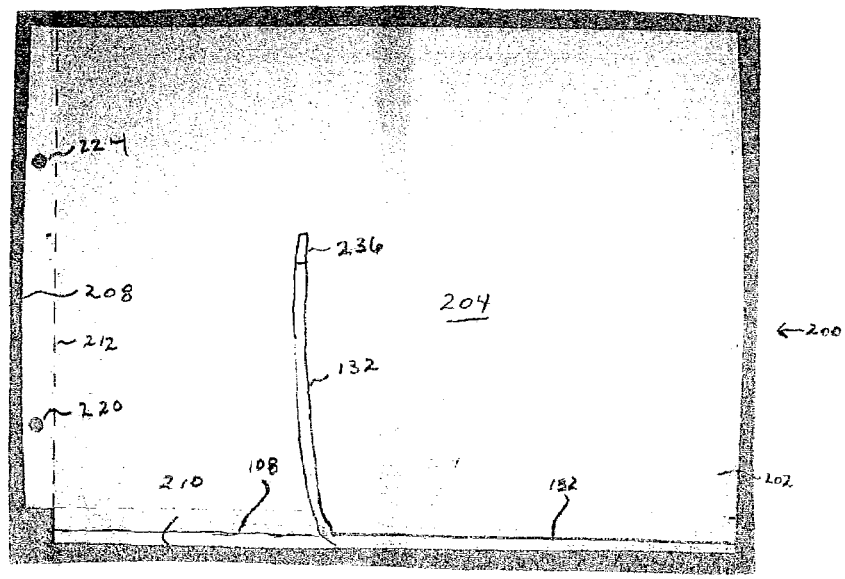

SUBSTRATE SHEETS WITH REMOVABLE STRIP

CROSS-REFERENCES TO RELATED APPLICATIONS

This application is a continuation-in-part of U.S. patent application Ser. No. 09/848,547, filed 3 May 2001 now abandoned, which in turn claims priority under 35 U.S.C. § 119 (e) to U.S. Provisional Application No. 60/201,409, filed May 3, 2000, each of the foregoing U.S. patent applications herein incorporated by reference.

BACKGROUND OF THE INVENTION

1. Field of the Invention

This invention relates to substrate sheets and, in particular, this invention relates to materials and methods of binding substrate sheets.

2. Background of the Invention

There is often a need to assemble printed pages as bound documents. Documents of this nature include wills, deeds, financial reports, family histories, and albums. Currently, substrate sheets with pressure-sensitive adhesive are known to be used for this process. These substrate sheets are first printed with the desired indicia, then stacked in the desired order and aligned. Before the substrate sheets are bound together, release layers must be removed from over the adhesive layers without disturbing the alignment or order of the printed substrate sheets. This procedure has been difficult to perform satisfactorily and the result has often been assembled documents which have sheets out of alignment and/or order.

U.S. Pat. No. 4,447,481, hereby incorporated by reference, discloses paper sheets having recessed pressure-sensitive glued edges with removable strips. The paper sheets have a recess along one edge, a non-drying adhesive applied in the recess, and a removable protective strip covering the adhesive. The combined thickness of the adhesive and strip are substantially equal to the depth of the recess to provide a sheet of uniform thickness with a protected pressure-sensitive adhesive edge.

U.S. Pat. No. 5,153,041, hereby incorporated by reference, discloses a pad assembly having a multiplicity of flexible sheets. Each sheet has a band of repositionable pressure-sensitive adhesive coded on its rear surface, adjacent and spaced by a small predetermined spacing from a first edge. The sheets are disposed in the stack with the band of repositionable pressure-sensitive adhesive on each sheet adhering it to the adjacent sheet in the stack. A layer of padding compound is disposed over, and adhered to, aligned first edges of the sheets in the stack. After the band of repositionable pressure-sensitive adhesive on the rear surface of one of the sheets in the stack is separated from the front surface of the adjacent sheet in the stack, the padding compound allows one sheet (and any sheets above it) to be pivoted away from that adjacent sheet while remaining adhered to the adjacent sheets. The small predetermined spacing between the band of repositionable pressure-sensitive adhesive and the first edge of each sheet provides a tactile feel when the band of repositionable pressure-sensitive adhesive on the rear surface of one of the sheets in the stack separates from the front surface of the adjacent sheet in the stack. The tactile feel signals the person peeling the sheet away that such separation has occurred, and allows that person to reduce the force being applied to the sheet, thereby restricting inadvertent separation of that sheet from the padding compound. After the sheet is intentionally separated from the padding compound, the band of repositionable pressure-sensitive adhesive on the sheet affords adhesion of that sheet to a vertical surface.

U.S. Pat. No. 6,013,149, hereby incorporated by reference, discloses a pad including coadhesively adhered sheets. The pad includes a plurality of flexible sheets in a stack and padding means for releasably adhering parts of the major surfaces of adjacent sheets in the stack together to maintain the sheets in the stack. The padding means is provided in that at least some of the sheets having patterns of coadhesively coated on their major surfaces, which patterns of coadhesive are adhered to patterns of coadhesive on adjacent sheets in the stack and releasably adhere parts of the major surfaces of adjacent sheets in the stack together in a surface-to-surface relationship until the patterns of cohesive are peeled apart.

U.S. Pat. No. 6,027,600, hereby incorporated by reference, discloses a dual simplex printer media and method. The method for printing includes the steps of feeding a multi-layer compound sheet into a dual-simplex printer, printing on each side of the multi-layer compound sheet, and separating the layers of the multi-layer compound sheet to produce at least two sheets having printed material on one side. The multi-layer sheets include a first layer and a second layer bonded to the first layer with pressure-sensitive adhesive.

U.S. Pat. No. 6,040,026, hereby incorporated by reference, discloses a pressure-sensitive adhesive sheet and laminate of pressure-sensitive adhesive sheets. The pressure-sensitive adhesive sheet includes a substrate sheet, a pressure-sensitive adhesive layer formed on one side of the substrate sheet, and a release layer. The release layer includes a cured product from a ionizing radiation-curing type releasable resin formed on the other side of the substrate sheet. A laminate includes a plurality of these pressure-sensitive adhesive sheets imposed on one another so that the pressure-sensitive adhesive layer and the release layer directly face each other and whole surfaces of the pressure-sensitive adhesive layers are covered with the release layer.

U.S. Pat. No. 6,153,278, hereby incorporated by reference, discloses a pad of adhesively secured sheets constructed so that individual sheets may be removed from a pad without the individual sheets having aggressively tacky or repositionable tacky coatings on exposed surfaces of the sheets after removal.

However, none of the presently available embodiments provides a substrate sheet with a pressure-sensitive adhesive protected by a release liner, which effectively protects the adhesive and which can be easily and quickly removed when binding documents made from the substrate sheets. There is then a need for a printable substrate sheet with a pressure-sensitive adhesive protected by a release liner, which can be efficiently and quickly removed.

SUMMARY OF THE INVENTION

This invention substantially meets the aforementioned needs of the industry by providing a sheet assembly, the sheet assembly including substrate(e.g., paper) sheets to which are adhered layers of adhesive and a tabbed release liner. The tab extends from an edge of the substrate sheet. The tab thus provides for easily grasping the release liner and subsequently removing the release liner efficiently and quickly without disturbing the stacked, aligned and ordered substrate sheets.

This invention further provides a process of making a document. The process includes using a composite sheet assembly, the composite sheet assembly including a substrate sheet, an adhesive layer, and a release liner with an extension. The substrate sheet may have a first edge and opposite second and third edges, the second and third edges converging with the first edge. The adhesive layer may be disposed on a substrate sheet a lower surface, approximate the substrate sheet first edge. The release liner may be disposed over the adhesive layer, such that the release liner extension extends past one of the substrate sheet second and third edges. The method includes 1) arranging a plurality of composite sheet assemblies in a desired order 2) removing the release liners by grasping each of the release liner extensions and peeling each release liner from an underlying adhesive layer, and 2) bonding the plurality of composite sheets together.

The present invention still further provides a method of making a composite sheet assembly. The method may include 1) disposing an adhesive layer over a surface of a substrate sheet; and 2) and overlaying the adhesive layer with a release layer, the release layer with an extension, such that the release layer extension extends beyond a first edge of the substrate sheet.

These and other objects, features, and advantages of this invention will become apparent from the description which follows, when considered in view of the accompanying drawings.

BRIEF DESCRIPTION OF THE DRAWINGS

This invention relates to, and can be further described with reference to, the accompanying drawings, wherein like reference numerals refer to like parts in the several views.

FIG. 2 is a side view of the substrate sheet of FIG. 1;

FIG. 3 is a side view of a multiplicity of the substrate sheets of FIG. 1 assembled into a bound document;

FIG. 5 is a plan view of a first side of another embodiment of the present substrate sheet with a removable strip;

FIG. 6 is a plan view of a second side of the substrate sheet of FIG. 5; and

FIG. 7 is a plan view of the first side of the substrate sheet of FIG. 5 a portion of the release layer removed exposing a portion of the adhesive layer.

It is understood that the above-described figures are only illustrative of the present invention and are not contemplated to limit the scope thereof.

DETAILED DESCRIPTION

Any references to such relative terms as front and back, right and left, top and bottom, upper and lower, horizontal and vertical, or the like, are intended for convenience of description and are not intended to limit the present invention or its components to any one positional or spatial orientation. All dimensions of the components in the attached figures may vary with a potential design and the intended use of an embodiment of the invention without departing from the scope of the invention.

Each of the additional features and methods disclosed herein may be utilized separately or in conjunction with other features and methods to provide improved embodiments of this invention and methods for making the same.

Representative examples of the teachings of the present invention, which examples utilize many of these additional features and methods in conjunction, will now be described in detail with reference to the drawings. This detailed description is merely intended to teach a person of skill in the art her details for practicing preferred aspects of the present teachings and is not intended to limit the scope of the invention. Therefore, only combinations of features and methods disclosed in the following detailed description may not be necessary to practice the invention in the broadest sense, and are instead taught merely to particularly describe representative and preferred embodiments of the invention.

Figure 1:
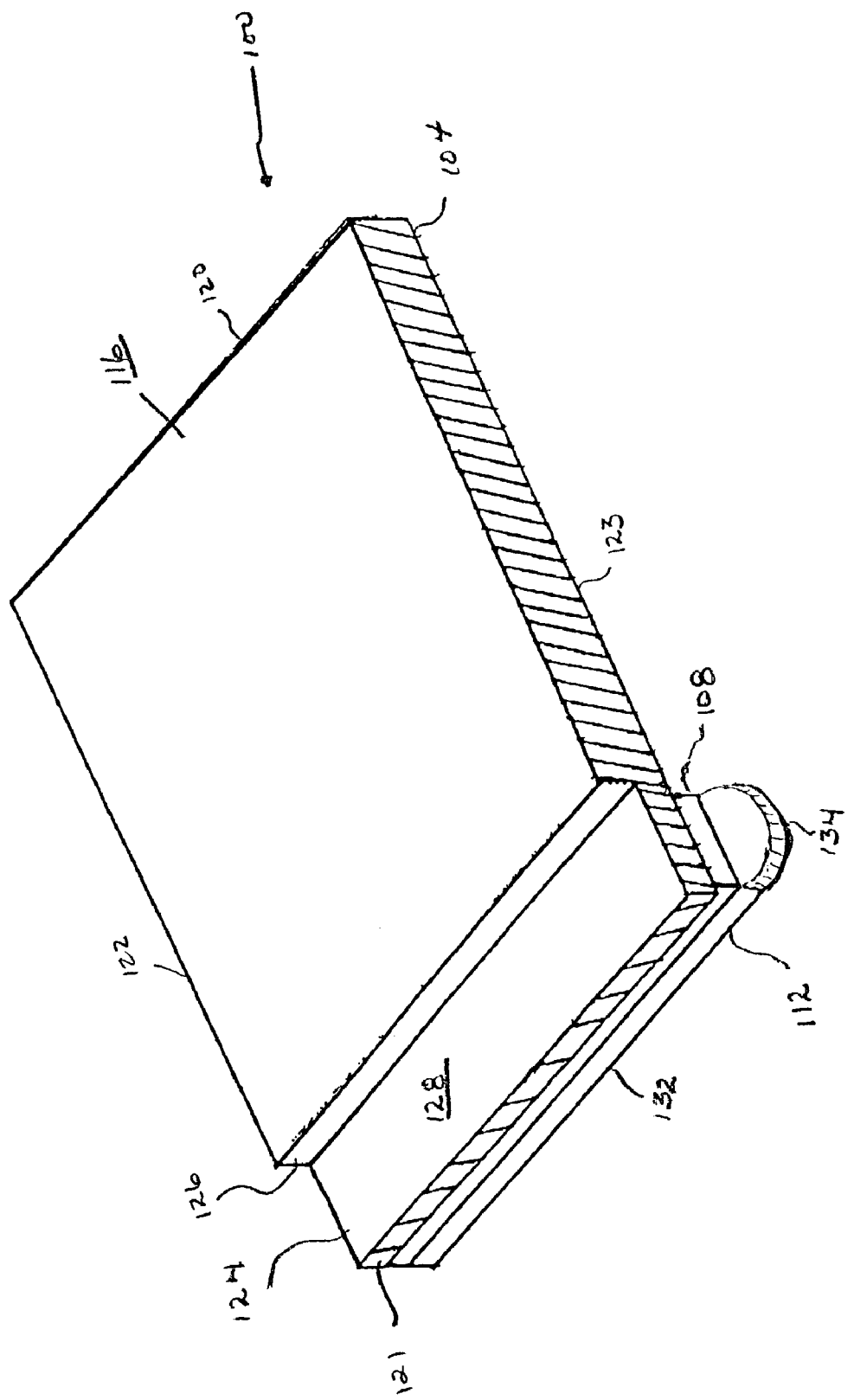
FIG. 1 is a perspective view of one embodiment of a substrate sheet according to the present invention.

Referring particularly to FIGS. 1 and 2, a composite assembly of this invention is depicted generally at 100 and includes a substrate sheet 104, an adhesive layer 108, and a release liner 112. The substrate sheet 104 displays a first (upper) surface 116, an opposite second (lower) surface 118, opposite first and second edges 120 and 121, opposite third and fourth (lateral) edges 122 and 123. An optional portion 124 is inboard from the edge 122 and proximate the first surface 116 and has a reduced thickness. The reduced thickness portion 124 extends between the second edge 122 and an edge 126. The edge 126 is defined where the second surface 118 and an upper surface 128 of the reduced thickness portion 124 meet in a stair-step fashion. The adhesive layer 108 is disposed on the second surface 118 of the substrate sheet 104, generally opposite the portion of reduced thickness 124, if the portion 124 is present. The release liner 112 substantially overlays the adhesive layer 108 and includes a main portion 132 and a tab portion 134. The tab portion 134 advantageously extends past the fourth (lateral) edge 123 as will be more fully discussed herein. The release liner may be formed and disposed on the present substrate sheet so as to be removed from the adhesive layer quickly, with ease, and without disturbing the alignment of ordered and aligned substrate sheets. One method for forming a release liner which meets these criteria is to provide a tab or other extension, which extends from one or more lateral edges of the substrate sheet and which, therefore, is easily grasped prior to the release liner being removed.

FIG. 3 depicts a multiplicity of substrate sheets 104 adhered together by the adhesive of adhesive layers 108. One process for making booklets or other bound materials involves printing the desired indicia on one or both sides 116 and 118 of the substrate sheet, then arranging the printed substrate sheets in the desired order. The ordered and printed substrate sheets are then aligned along one or two of the edges 120–123 and optionally secured in the set order and alignment, e.g., with a press or vice. The release liners 112 are then removed by grasping the tabs 134 and peeling the remainder of the release liners from the substrate sheets. Stacked, adjacent sheets with the release liners removed therefrom, are then adhered together by being pressed together bonding the adhesive layer to the substrate sheet directly above. A "bottom" sheet without an adhesive layer may be used to provide an end sheet without an exposed adhesive layer if desired.

Figure 4:
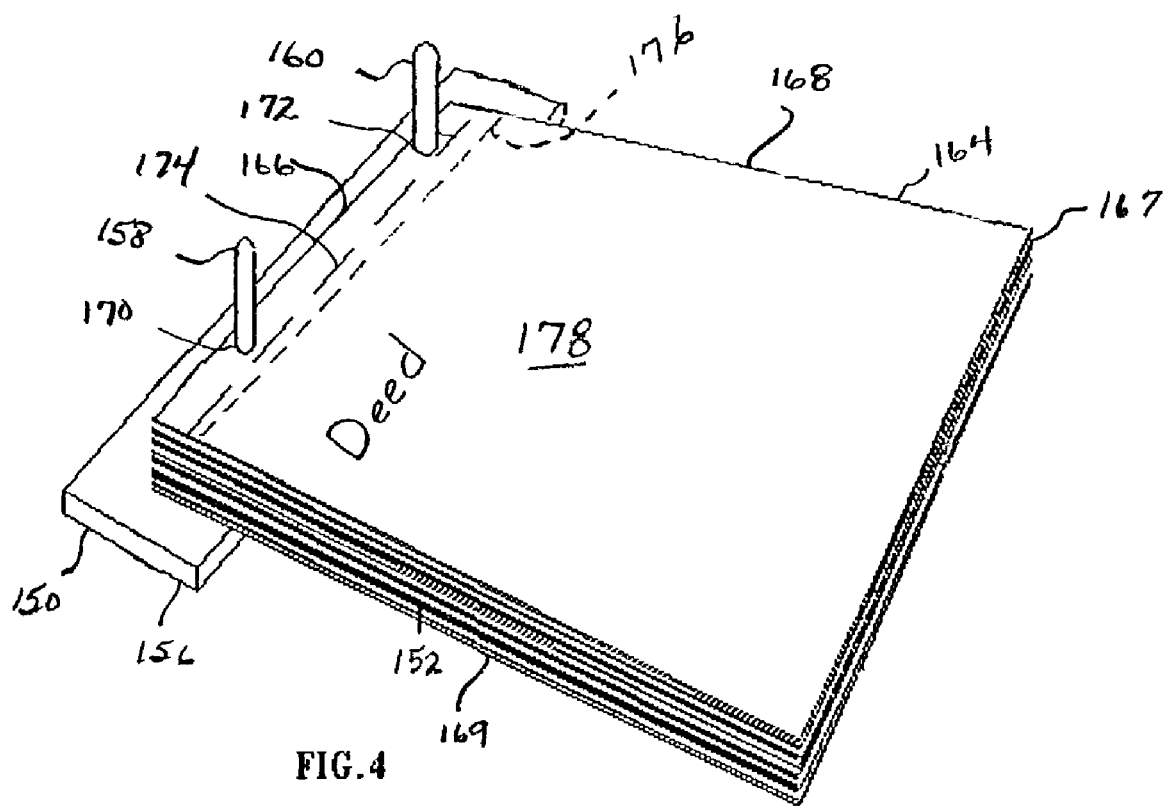
FIG. 4 is a perspective view of a second embodiment of the present substrate sheets being held in place with a holder.

One embodiment of a device for aligning substrate sheets of the present invention is shown in FIG. 4 at 150, wherein a multiplicity of composite assemblies 152 are being maintained in an aligned position, perhaps after being printed. The holder includes a base 156 and aligning structure, such as dowels 158 and 160. Each composite assembly includes a substrate sheet 164, which displays opposite first and second edges 166 and 167 and opposite third and fourth (lateral) edges 168 and 169. Holes 170 and 172 are dimensioned to accommodate the dowels 158 and 160 and have been uniformly formed in each substrate sheet 164 so as to align with, and fit into, the dowels 158 and 160. A linear series of perforations 174 has been uniformly formed in each substrate sheet 164. The perforations 174 are disposed inboard of the holes 170 and 172. In the embodiment depicted, the perforation series 174 is generally parallel to the edges 166 and 167 and parallel, or otherwise transverse, to the edges 168 and 169. An adhesive layer 176 is shown in phantom on a lower surface of the top substrate sheet 164 (opposite an upper surface 178). The substrate sheets in this embodiment are shown adhered together after the release liners (not shown) have been removed and the substrate sheets pressed together to adhere (bond) each release layer to a bottom surface of an overlying substrate sheet. The release liners of this embodiment would include an extension, such as a tab, extending from one of the lateral edges so that the release liners could be easily grasped when being removed. The assembled and bound document can then be completed by cutting or tearing along the perforation 174.

The present substrate sheets can be made using any conventional material suitable for the purpose. A non-limiting recitation of materials suitable under certain circumstances includes bond, clay-coated paper, opaque or translucent polymeric material, and carbonless paper.

The present adhesive layer includes an adhesive which may be a low-peel, pressure-sensitive adhesive or a high-peel pressure-sensitive adhesive (e.g., ethylene vinyl acetate copolymer, polyurethane reactive polymer). The opposing sheet surface, when stacked or covered for compositing (discussed more fully herein), maybe free of adhesive and release coating. If so, the present composite sheet may include a release coating where appropriate. One adhesive suitable for permanent attachment is a hot melt, pressure-sensitive tight adhesive Formulation No. 1P84024, manufactured and sold by Swift adhesives, Chicago, Ill. A reusable adhesive, which may be suitable under certain circumstances, is a hot melt, pressure-sensitive adhesive No. HM1618, manufactured and sold by the H. B. Fuller Company, St. Paul, Minn. Other adhesive materials are recited below and are suitable for uses in certain circumstances.

The present release liner may include a silicone material. Other materials potentially suitable for the present release liner include acrylates, urethanes, Mylar.RTM., and W-593.RTM. Mylar.RTM. is a polyester tape manufactured by the DuPont Co., Wilmington, Del. W-593 is a natural latex adhesive available from the H. B. Fuller Company, St. Paul Minn. Another material which may be suitable for use in the present release liner under certain circumstances is a low-adhesion coating of a polyvinyl carbamate polymer disclosed in U.S. Pat. No. 2,532,011, hereby incorporated by reference. However, persons of ordinary skill in the art will readily recognize that other adhesive materials may be suitable under certain circumstances as dictated by desired use and substrate and release liner materials. The present release liner may be elastic to the extent that it can be easily removed during assembly, yet support the present composite sheet during printing. In one embodiment, the present release liner further protects the adhesive from heat and pressure encountered during printing.

Referring to FIGS. 5–7, another embodiment of the present substrate sheet with removable strip is depicted generally at 200 and includes a substrate 202, an adhesive layer, and a release liner. The adhesive layer and the release liner may be similar, or substantially identical, to the adhesive layer 108 and the release liner 132. The substrate 202 displays a first surface 204, a second surface 206, and converging edges 208 and 210. Perforation lines 212 and 214 are formed in the substrate 202 so as to intersect and so as to be substantially parallel to respective edges 208 and 200, the perforation 214 extending between the perforation 212 and the edge 208. The edges 208 and 210 and the perforations 212 and 214 cooperate to define a tab 220. As in the previous embodiment, the adhesive layer 108 may overlay a portion of reduced thickness formed in the substrate 202. A pair of holes 220 and 224 may be formed in the substrate 202 between the perforation 212 and the edge 208. Indicia, such as designated at 226 and 228, may be formed in the substrate 202 and indicia, such as designated at 230, may be present on the tab 220. The indicia 226 and 228 may be used to designate a trademark or printing directions and the indicia 230 may be used to label the tab 230 and contain directions as explained hereinbelow.

In use, the substrate is routed through a printer or printing or writing is otherwise placed on the substrate edge 206. Then, separate substrates 202 may be concatenated in a substantially overlaying fashion. First the substrates 202 are stacked in the desired order. And, the tab 230 are removed from the substrates 202 by tearing along the perforations 200 and 214, thereby exposing a portion of the release liner 132 extending beyond the perforation 212 and designated at 236. The release liner portion 236 from each underlying substrate 202 is then pulled away from the adhesive layer 108 in the manner depicted in FIG. 7. When the release liners 132 of underlying substrates 202 have been removed, the stacked (concatenated) substrates 202 are pressed together to be adhered by the adhesive layers 108. Finally, a portion of the substrate 202 between the edge 208 and the perforation 212 may be removed by being torn away at the perforation 212. Aligning the edges of the present stacked substrates may be so located by extending dowels 158 and 160 therethrough in the manner as depicted in FIG. 4.

EXAMPLE I

Composite sheets were made using 20-pound bond paper 156 mm in width and 279 mm in length and commercially available as Astrobright.RTM., from Wausau Papers, Inc., Wausau, Wis. A double-coated tape web, available as 3M Scotch Brand Tape Product #109.RTM., available from 3M Company, St. Paul, Minn., was applied along (proximate) one edge of each composite sheet. A tab on the release layer was then formed, the tab extending from a composite sheet lateral edge. However, a self-adhesive, comprising a base stock plus adhesive and a release liner (layer), could have been used as well. Indicia were printed on the composite sheet using a Mark Andy 2200.RTM. flexographic printing press. However, other printing equipment, e.g., a Gross C700.RTM. or C500.RTM. press with an Enkel Paster.RTM. and a Vits Sheeter.RTM. and a rotary die cutting station, could have been used. The present composite sheets were then aligned manually. When the printed composite sheets were stacked in a desired order, they were secured in a desired alignment with a press. The release liners were then removed from each composite sheet by grasping the tabs and peeling the remainder of the release liner from the underlying adhesive layer. Once the release liners were removed, the sheets in the stack were bonded together by being pressed together.

EXAMPLE II

Composite sheets were made using the materials and protocol described in Example I, except that the sheets were crushed to form lines of weakness prior to the adhesive layers and release liners being disposed thereon. The lines of weakness provided generally linear borders for separating portions of the composite sheets. The composite sheets were printed using a Hewlett-Packard LaserJet 5L Laser Printer-.RTM. by passing the composite sheets through the printer twice to print both surfaces. Some of the printed sheets were used as single, custom-printed, blank documents to be bound after being filled out. However, others were aligned and stacked, generally as described in Example I.

EXAMPLE III

Composite sheets were made using sheets of 20-pound bond paper, a low-peel pressure-sensitive adhesive, and a silicone release material. Adhesive layers were formed near one lateral edge the composite sheets using a 5 mm-wide strip of Scotch Brand Tape Product #109, a double-coated tape with a low-peel adhesive on one side and a permanent adhesive on the other side. The side of the tape with the permanent adhesive was applied to the paper surface about 2 mm from a lateral edge A release layer with a tab extending from the lateral edge was then formed on each composite. The composite sheets were crushed in a band proximately 1 mm from an edge to form paths of weakness. The sheets were printed on both sides with a Hewlett-Packard LaserJet 5L Laser Printer.RTM. and bound using the protocol of Example I.

EXAMPLE IV

Substrate sheets were made using the double-coated Scratch Brand Tape Product #109.RTM. transfer tape. The adhesive layers were formed by laminating a 6 mm wide strip of the Scotch Brand Tape #109.RTM. 2 mm from the sheet edge. The release layer was approximately 7 mm in width and was spaced about 2 mm from lateral edges of the substrate sheets. The composite sheets were crushed to form paths of weakness. The substrate sheets were printed with a Hewlett-Packard LaserJet 5L Laser Printer.RTM. The printed substrate sheets were stacked and aligned in a desired order, then secured with a press. The release layers were then separated from the adhesive layers in the manner described in Example I. Stacked, adjacent composite sheets were adhered to each other by being pressed together. The bottom sheet of one substrate sheet was adhered to a plain sheet without adhesive on an opposite surface thereof

EXAMPLE IVa

The protocol described in Example IV was followed, except that paths of weakness were formed by microperforation.

EXAMPLE V

Substrate sheets were made as described in Example III, above. These substrate sheets were printed and inserted into an alignment tool. The alignment tool includes two perpendicularly oriented edges and a press. The printed substrate sheets were stacked in a desired order and two adjacent edges of the substrate sheets were aligned using the alignment tool edges and secured in alignment with the press. The release liners were then removed and stacked, adjacent sheets were adhered by being pressed together.

EXAMPLE VI

Substrate sheets were made from the materials and methods of Example I by applying a release liner of a silicone material. The material for the silicone release liner was compared to a prior art release liner with a silicone-coated, polyolefin surface. The silicone release liner was less expensive to produce and had a substantially increased initial tack and "grab," perhaps due to a larger contact area. Moreover, variability of the release force required to separate the release liner was minimized. The force required for release was between 30 and 40 grams per linear inch (Keil PSTC Standard, Johnson & Johnson Test Method) and was constant within a relatively narrow range. The silicone release material was substantially thinner and occupied less volume as well. Furthermore, formation of dust and loose fibers was less when using the silicone release material. Moreover, because of the greater contact area, there was a decrease in exposure of the adhesive to air, thereby minimizing the deleterious effects of aging on the adhesive.

EXAMPLE VII

Composite sheets were made according to the materials and procedures of Example I. A composite sheet was crushed to a depth of about 1 mm proximate one of the composite sheet lateral edges to form a path of weakness. An adhesive layer was applied over the crushed portion. The adhesive used was Scotch Brand Tape #109.RTM. A release layer was then applied over the adhesive layer such that tabs extended from one of the lateral edges of each of the composite sheets. The material used in the release layer was a polyolefin-surfaced (polyethylene), silicone-coated release backing paper as described in U.S. Pat. No. 3,533,899, hereby incorporated by reference. The release liner was prepared with a high degree of mechanical crepe, so that convexly bending the release liner with concurrent thumb pressure tended to stretch the release layer, thereby loosen the release layer from the adhesive. The composite sheets were then printed using a Hewett-Packard LaserJet 5L Laser Printer. The printed sheets were stacked in a desired order, aligned, and secured as described in Example VI, above. The tab on each composite sheet was then pulled to loosen the release liner from the adhesive layer. The loosened release liner was then completely separated from the adhesive and stacked, adjacent sheets were adhered together by using pressure.

EXAMPLE VIII

A testing protocol was performed on composite sheets made using the materials and methods disclosed in Example I, above. The test indicated that the force required to separate two sheets adhered together by the adhesive layer was about 5 pounds per lineal inch.

The present invention has been described with reference to several embodiments. It will be apparent to a person or ordinary skill in the art that many changes and alterations can be made in the embodiments described and taught without departing from the spirit and scope of the present invention. For example, the paths of weakness between the sheets can be provided in many ways other than crushing or perforations that bind the edges of the sheets together and allow the sheets to be pivoted relative to each other along the paths of weakness while providing sufficient integrity. These ways include weakening composite sheets by crushing or scoring, chemical treatments, and the like. The substrate sheets are bonded by gluing their edges together, joining their edges by a length of adhesive-coated tape, or coating adhesive directly onto the substrate sheet, or the like.

What is claimed is:

1. A composite sheet assembly, comprising:
   a printable substrate sheet with an upper surface and opposite lower surface, first and second converging edges, a generally linear first line of perforations formed generally parallel to the first edge and a second line of perforations generally parallel to the second edge and extending between the first line of perforations and the first edge, a removable tab bounded by the first and second lines of perforations and the first and second edges, the substrate sheet having a marginal first portion of reduced thickness disposed generally inboard and adjacent the first line of perforations the reduced thickness first portion is located on the upper surface of the sheet;
   an adhesive layer is adhered on the lower surface of the reduced thickness first portion of the substrate sheet and is disposed inboard and proximate the first line of perforations, a remaining second portion of the substrate sheet free of the adhesive layer; and
   a release liner releasably disposed over the adhesive layer and further including a portion that overlies the tab.

2. The composite assembly of claim 1, in which the tab is generally rectangular.

3. The composite assembly of claim 1, in which the tab is generally square.

4. The composite assembly of claim 1, the substrate sheet comprising a material selected from bond, clay-coated paper, polymeric material and carbonless paper.

5. The composite assembly of claim 1, the adhesive layer comprising an adhesive selected from low-peel, pressure-sensitive adhesive and high-peel, pressure-sensitive adhesive.

6. The composite assembly of claim 1, the release liner comprising a silicone.

7. The composite assembly of claim 1, the release liner comprising a material selected from a silicone, an acrylate, a urethane, a polyolefin, and a polyvinyl carbamate.

* * * * *